United States Patent Office 2,947,365
Patented Aug. 2, 1960

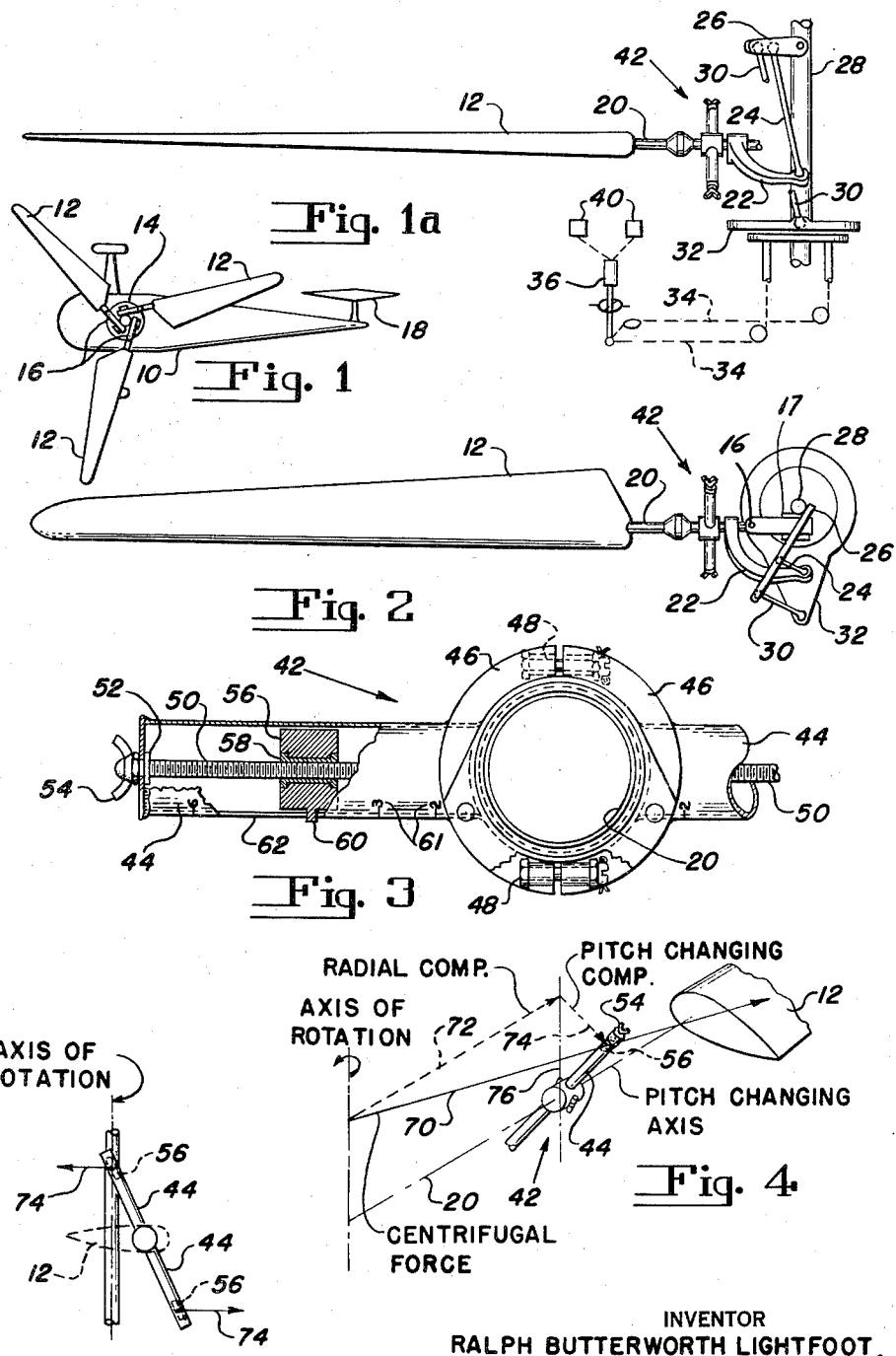

2,947,365

MEANS FOR DYNAMICALLY BALANCING ROTOR BLADES

Ralph B. Lightfoot, Stratford, Conn., assignor to United Aircraft Corporation, East Hartford, Conn., a corporation of Delaware Continuation of application Ser. No. 219,723, Apr. 6, 1951, which is a division of application Ser. No. 613,190, Aug. 28, 1945, now Patent No. 2,552,727, dated May 15, 1951. This application Feb. 23, 1956, Ser. No. 567,390

15 Claims. (Cl. 170—159)

This application is a continuation of my copending application Serial No. 219,723, filed April 6, 1951, now abandoned, which is a division of application Serial No. 613,190, filed August 28, 1945, which issued as Patent No. 2,552,727, and assigned to the same assignee as this application.

This invention relates to means for dynamically balancing rotor blades of a multi-bladed rotor for aircraft commonly referred to as helicopters. The device is adapted for use on that type of helicopter in which the pitch of the rotor blades is changed cyclically as they rotate in forward flight.

The device may be installed upon a spar of a rotor blade and adjusted thereon in accordance with readings, taken by conventional instruments, of the action of the control connections to a rotor blade so as to correct the dynamic pitching moment of a blade when it is rotated and balance the same with the dynamic pitching moment of the other blades and thus provide a balanced blade system in which no loads are transmitted from the blades to the stick in flight due to the pitching moments of the cyclically controlled blades.

By dynamic pitching moment is meant the moment taken around the feathering axis of the blade resulting from the centrifugal forces acting on the elements of the blade throughout its span when the blade is rotated around the upstanding drive shaft of the helicopter. The physical manifestation of this dynamic pitching moment results in a vertical force in the push rod connection between the blade horn and the swashplate through which the blade pitch is controlled.

Due to the fact that the angle of attack and the air speed of the rotor blades changes cyclically as they rotate in forward flight, a cyclic vertical movement of the blades occurs. These two cyclic variations result in corresponding cyclic changes in the aerodynamic pitching moment in each blade. The device of this invention, by creating a cyclically varying dynamic pitching moment in each blade when a cyclic pitch change occurs, not only enables the dynamic pitching moments of the several blades to be compensated as pointed out above, but at the same time enables the resultant moment due to the cyclically varying aerodynamic pitching moments to be equalized in the several blades.

An object of this invention, therefore, is to provide means for balancing pitching moments and/or damping vibrations in rotor blades for rotary wing aircraft.

Another object is to provide readily adjustable means for carrying out the above object.

Other objects and advantages reside in the details of construction of the device and will be either pointed out or obvious from the following specification and claims.

In the drawing:

Fig. 1 is a diagrammatic plan view of a multi-bladed helicopter;

Fig. 1a is a diagrammatic view of one rotor blade with its control connections to the manual control stick;

Fig. 2 is a plan view of the structure shown in Fig. 1a;

Fig. 3 is a sectional view of the spar of the rotor blade with the pitching moment compensator and damper mounted thereon with parts in section to show the adjustment;

Fig. 4 is a vector diagram of the forces acting upon a rotor blade for adjusting the pitching moment in response to centrifugal force due to rotation of the blade about the helicopter drive shaft axis; and Fig. 5 is a diagrammatic view showing the pitch changing components of centrifugal force on the compensator acting as a couple around the rotor blade spar or feathering axis under dynamic conditions due to rotation around the helicopter drive shaft axis.

Referring more in detail to the drawings in Fig. 1, a helicopter 10 is provided with a plurality of blades 12 pivotally mounted upon a hub 14 by drag hinges 16 and flapping hinges 17. A tail rotor 18 is arranged with respect to the body of the helicopter 10 to counteract the torque of the blades 12.

In Figs. 1a and 2, a blade 12 is mounted on a spar 20 which may be rotated by a control horn 22 through a rod 24 connected with a link 26 that may be positioned at either of its ends by a total pitch rod 28 or a cyclic pitch rod 30 carried upon a tiltable star 32 that is positioned by cables 34 from a universally pivoted azimuthal control stick 36. The total pitch control stick has not been shown because, for purposes of test of the pitching moment compensator to be described below, the total pitch stick is locked in position and the forces are measured by conventional force indicating instruments 40 to record forces which are fed from the blade 12 through the cyclic pitch control linkage recited above to the control stick 36. For testing purposes, the control stick 36 is retained in position by the instruments 40.

A pitching moment adjustment mechanism is represented by the reference character 42 in Figs. 1a and 2 and shown in detail in Fig. 3. The mechanism 42 comprises a pair of tubes 44 containing similarly constructed parts only one of which will be described. The tubes 44 are carried by arcuate segment collars 46 secured together by bolts 48. The bolts 48 may be loosened and the collars 46 rotated around the spar to change the position of the tubes 44. An adjustment screw 50 is mounted on a collared pivot 52 and is provided with wings 54 which may be turned to rotate the screw 50. A weight 56 has a screw-threaded inner sleeve 58 that mates with the screw 50, and a projection 60 which rides in a slot 62 in the tube 44. Indicia 61 cooperate with the projection 60 to indicate the position of the weight 56. When the wings 54 are turned, the weight 56 will be moved along in the tube 44 to change the effectiveness of the weight 56 in obtaining a pitching moment compensating force.

In Fig. 4, the blade 12 is assumed to be rotating around the axis of rotation as indicated by the arrow. The weight 56 in the tube 44 is shown as tilted upwardly and backwardly from the center-line of the spar 20. The lower weight 56 could have its forces represented similarly as the two weights 56 act to provide a couple as shown in Fig. 5, but only the forces acting upon one weight will be described for purposes of clarity.

The centrifugal force acting upon the weight 56 will act directly outwardly from the axis of rotation and is represented by the line 70 having the reference "Centrifugal force." Inasmuch as the spar 20 mounts the tube 44 of the pitching moment compensating mechanism 42, the centrifugal force will be broken up into two components, one taken laterally by the spar 20 as represented by the line 72 bearing the reference "Radial component." By completing the force triangle, a pitch changing component as indicated at 74 in Fig. 4 will be created due to the angle of the tubes 44 with a line 76 parallel to the axis of rotation. The magnitude of this force can be changed by changing the position of the weight 56 by rotating the wings 54 as pointed out in connection with Fig. 3.

In Fig. 5 which is a view looking from the blade 12 toward the axis of rotation, the tubes 44 carrying weights 56 will exert a pitch increasing couple indicated by arrows representing the pitch changing components 74 due to blade rotation about the axis of rotation of the helicopter drive shaft.

Since a helicopter rotor blade changes its angle of attack and its air speed cyclically as the blade rotates in forward flight, a cyclic flapping movement of the blade may occur about the flapping hinge 17 (Fig. 2) as well as a cyclic pitch change around its feathering axis. This cyclic flapping of the blade and the cyclic variation in angle of attack and air speed of the blade result in cyclic changes in the aerodynamic pitching moments of the blade. The mechanism 42 when installed on a blade 12 mounted as shown in Fig. 2 is capable of creating a cyclically varying dynamic pitching moment when a cyclic pitch change occurs which can be adjusted to compensate not only for dynamic pitching moments but also for the aerodynamic pitching moments identified above which result from blade flapping and air speed.

In the operation of the device described above, the control stick 36 is held in place by the indicating mechanisms 40. These force indicating instruments indicate the load on the stick, one indicating the lateral stick load and the other the fore and aft stick load. The rotor blades 12 are caused to rotate by an engine, not shown, and readings of the vibrations fed from the blades 12 to the control stick 36 are taken. Thereafter, the blades 12 are stopped and the pitch compensating mechanism 42 is adjusted on one of the blades 12. Thereafter another run is tried under substantially the same load conditions for the blades 12 and a second reading is taken.

This second reading compared with the first reading will indicate whether a given vibration has been aggravated or diminished by the adjustment. Thereafter, the mechanism 42 can be adjusted by loosening the bolts 48 and rotating the collars 46 about the spar to a position to reduce the vibration towards the minimum. Also the magnitude of the pitching moment of the blade can be adjusted by the screws 50, by using the indicia 61, so that a finer adjustment can be made without further runs once an operator becomes skilled in the use of the present device.

The present device also can serve to absorb transient blade vibrations as the blade rotates because of the fact that the weights 56 are spaced from the spar 20 and offer rotational inertia to pitch change of the blade around the spar or feathering axis opposite to their own moment, as pointed out above. Thus, for an upsetting force caused by aerodynamic conditions tending to rotate a blade 12, the mechanism 42 will resist such force due to inertia.

Inasmuch as such vibrations are usually cyclic in nature in rotary wing aircraft in flight, the weights 56 can be adjusted both angularly around the spar and axially along the screws 50 to maintain substantially a constant dynamic pitch reducing moment but a different aerodynamic damping characteristic.

Considering more in detail the possible compensating adjustments of which the mechanism 42 is capable it will be evident that these fall into three main categories:

(1) The mechanism can be adjusted bodily angularly about the spar axis by loosening bolts 48 to get either a pitch increasing or a pitch decreasing moment as needed. If the weights 56 are symmetrically disposed (equidistant from the spar axis) the C.G. of the blade will not change during this adjustment. If the weights are unsymmetrically disposed the C.G. of the blade can be moved either forward or backward.

(2) Both weights 56 can be moved in tubes 62 either toward or away from the spar axis but maintained the same distance from the spar axis to compensate for aerodynamic unbalance. In other words, the moment vs. pitch angle curve of the blade can be "moved bodily" up or down.

(3) The weights can be moved in tubes 62 into unsymmetrical positions relative to the spar axis. This adjustment of the weights changes the "slope" of the moment vs. pitch angle curve of the blade.

By one or more of the above adjustments it is possible to balance the dynamic pitching moments of the blades of a rotor and also to counteract the cyclically varying aerodynamic pitching moments encountered in forward flight on rotors which are not aerodynamically balanced. By correctly adjusting the weights, the displacement of the moments vs. angle curve for the blades can be made to substantially coincide.

While only one device connected with one blade has been shown and described in detail, it is obvious that all of the blades may contain such a dynamic and aerodynamic pitching moment compensator, or only some of the blades need be so equipped to obtain the objects of the present invention. It is also obvious that the present device can be used to give a dynamic pitch decreasing moment rather than a dynamic pitch increasing moment as described by moving the weights 56 into the other quadrants around the spar 20. It can readily be seen that if the dynamic pitching moments of all the blades of a rotor are not equal in magnitude and direction, these forces will be transmitted into the swashplate as a vertical vibration which will in turn be transmitted to the stick as a rotary motion. Of course it will be readily understood that the static moment of the weights around the feathering, or spar axis, of the blade will be of no concern inasmuch as when the rotor is stationary these static moments of the weights cannot transmit any vibrational forces to the controls. Of course these static forces are relatively insignificant when compared with the dynamic forces which these weights may produce during rotation of the rotor. It is also to be noted that the dynamic pitch changing moment around the feathering or pitch changing axis due to the mechanism 42 follows a trigonometric function attaining a minimum when the weights 56 lie in the plane of rotation of the blade 12 and also when they are perpendicular to that plane, and a maximum at 45° in each quadrant.

From the foregoing, it is obvious that many modifications of the present invention will occur to those skilled in the art. For this reason, I do not wish to be limited in my invention only to that form shown and described but by the scope of the following claims.

I claim:

1. In rotary wing aircraft, a rotor drive shaft, a plurality of variable pitch rotor blades pivotally mounted on said shaft for flapping movements and rotatable substantially in a plane, a horn carried by each blade for moving it about its pitch varying axis, pilot controlled means for holding each blade in a predetermined pitch varying regime as the blades rotate including a tiltable swashplate mechanism and link means connecting each of said blade horns with said swashplate mechanism, means for dynamically balancing the pitch changing moments of the several blades comprising weight supporting means secured to each blade at a substantial angle to the chordline of said blade and extending on opposite sides of said pitch changing axis, weights carried by said supporting means on opposite sides of said axis to produce a cyclically varying pitch changing couple in response to centrifugal force resulting from rotation of said blades, and means for adjusting each of said weights with respect to its blade to change the pitch changing moments of the several blades until said blades are dynamically balanced.

2. In a rotary wing aircraft, an upstanding drive shaft, at least two rotor blades pivotally mounted on said shaft for rotation in a plane at right angle to and planes other than at right angle to said shaft, and weight means mounted on each of said blades so as to change pitch with the latter, said weight means being located adjacent the blade roots and substantially offset from the plane of the chordlines of said blades, each of said weight means also being mounted outboard of the pivotal mounting for its respective blade.

3. In a rotary wing aircraft, an upstanding shaft, at least two variable pitch rotor blades rotatable about the axis of said shaft and pivotally connected thereto, pilot controlled means for holding each blade in a predetermined pitch varying regime, and means for changing the dynamic pitching moment of one blade relative to the dynamic pitching moment of another blade at all blade pitch angles comprising weight means secured to at least one blade outboard of said pivotal connection of said blade to said shaft and substantially spaced from the plane of the chordlines of said blade.

4. In a rotary wing aircraft, an upstanding drive shaft, at least two variable pitch rotor blades rotatable about the axis of said shaft and pivotally connected to said shaft for rotation in a plane at right angles to and planes other than at right angle to said shaft, pilot operative mechanism for varying the pitch of said blades as they rotate, and means to produce a varying pitch changing force including weight means mounted to change pitch with each blade, said weight means including weight substantially spaced from the chordline of each blade for producing a controlled pitching moment acting on said pitch control mechanism.

5. In a rotary wing aircraft, an upstanding drive shaft, a variable pitch blade rotatable about the axis of said shaft and pivotally connected to said shaft for rotation in planes at various angles relative to said shaft, said blade having a root end pilot controlled means for holding said blade in a cyclic pitch varying regime, and weight means substantially spaced from the chordline of the blade adjacent its root end and mounted to move with the blade as the latter cyclically changes pitch and as the latter moves in said planes at various angles relative to said shaft.

6. In a rotary wing aircraft, an upstanding drive shaft, a variable pitch blade rotatable about the axis of said shaft and pivotally connected to said shaft for rotation in planes at various angles relative to said shaft, pilot controlled means for varying the pitch of said blade, and weight means substantially spaced from the chordline of the blade and mounted to move with the blade as the latter changes pitch in said planes at various angles relative to said shaft to compensate for pitching moments of said blade.

7. In a rotary wing aircraft, an upstanding drive shaft, a variable pitch blade pivotally mounted to rotate with said shaft at various angles relative to said shaft axis, pilot actuated means for controlling the pitch of said blade cyclically, and means for producing a cyclic moment throughout each revolution of said blade about said axis, said means comprising weight means mounted to move with said blade as the latter cyclically changes pitch, said weight means having weight substantially spaced from the chordline of said blade.

8. In a rotary wing aircraft, an upstanding shaft, a variable pitch blade rotatable about the axis of said shaft and movable into various angular positions relative to said shaft axis, pilot actuated means for controlling the pitch of said blade cyclically, and means for creating a cyclically varying dynamic pitching moment in said blade which is opposite and equal to the combined dynamic pitching moment of said blade and the aerodynamic pitching moment of said blade resulting from cyclic changes in angle of attack and relative air speed of said blade as the latter rotates in forward flight comprising weight means mounted on the blade at a substantial angle to the chordline of said blade.

9. In a rotary wing aircraft, an upstanding drive shaft, at least two variable pitch rotor blades rotatable about said shaft, said blades being pivotally connected to said shaft for movement into a position at right angle to and positions other than at right angle to said shaft, pilot operable means for varying the pitch of said blades, said means including a connection to said blades, and means for counteracting the dynamic and aerodynamic pitching moment of the blades including weight means attached to each blade for producing a controlled dynamic pitching moment acting on said pitch varying means, each weight means being positioned at a substantial angle to the chordline of its blade, said weight means of each blade being attached adjacent said connection of said pilot operable means to said blade.

10. In a rotary wing aircraft, an upstanding drive shaft, at least two variable pitch rotor blades rotatable about said shaft, said blades being pivotally connected to said shaft for movement into a position at right angle to and positions other than at right angle to said shaft, pilot operable means for cyclically varying the pitch of said blades as they rotate, said means including a connection to said blades, and means for counteracting the cyclic dynamic and aerodynamic pitching moment of the blades including weight means attached to each blade for producing a controlled cyclic dynamic pitching moment acting on said pitch varying means, said weight means having weights substantially spaced from the plane of blade rotation, each weight means having an arm extending at a substantial angle to the chordline of its blade which supports said weight, each arm of the weight means of each blade being attached adjacent said connection of said pilot operable means to said blade, each weight means having its attachment adjustable providing for movement of said weight means around said blade.

11. In a rotary wing aircraft, an upstanding drive shaft, at least two variable pitch rotor blades rotatable about said shaft, said blades being pivotally connected to said shaft for movement into a position at right angle to and positions other than at right angle to said shaft, pilot operable means for cyclically varying the pitch of said blades as they rotate, said means including a connection to said blades, and means for counteracting the cyclic dynamic and aerodynamic pitching moment of the blades including weight means attached to each blade for producing a controlled cyclic dynamic pitching moment acting on said pitch varying means, each weight means being substantially spaced from the chordline of each blade, said weight means of each blade being attached adjacent said connection of said pilot operable means to said blade, each weight means having its attachment adjustable providing for movement of said weight means around said blade, each weight means comprising a weight on opposite sides of said blade, each weight being independently movable to a position along an axis extending from said blade.

12. In a rotary wing aircraft, an upstanding drive shaft, at least two variable pitch rotor blades rotatable about the axis of said shaft and having a pivotal connection to said shaft for rotation in a plane at right angle to and planes other than at right angle to said shaft, said connection including a first pivot at right angles to said shaft axis, a second pivot at right angles to said first pivot, pilot operable mechanism including a swash plate for cyclically and collectively varying the pitch of said blades about said second pivot as they rotate, and means for counteracting the dynamic and aerodynamic pitching moments of the rotating blades in flight including weight means mounted to change pitch with the blades about said second axis and to move with said blades about said first axis, said weight means being substantially spaced from the chordline of the blades and substantially outside the aerodynamic contour of the blades for producing a controlled dynamic pitching moment acting on said pilot operative mechanism.

13. In a rotary wing aircraft, an upstanding drive shaft, at least two variable pitch rotor blades rotatable about the axis of said shaft and having a pivotal connection to said shaft for rotation in a plane at right angle to and planes other than at right angle to said shaft, each blade having a root end said connection including a first pivot at right angles to said shaft axis, a second pivot at right angles to said first pivot, pilot operable mechanism including a swash plate for cyclically and collectively varying the pitch of said blades about said second pivot as they rotate, and means for counteracting the dynamic and aerodynamic pitching moments of the rotating blades in flight including weight means mounted to change pitch with the blades about said second axis and to move with said blades about said first axis in a plane at right angle to and planes other than at right angle to said shaft, each weight means being substantially spaced from the chordline of its blade adjacent the root end of the blade for producing a controlled dynamic pitching moment acting on said pilot operable mechanism as said blades rotate in any of said planes, said weight means being attached to said blade outboard of said first pivot.

14. In a rotary wing aircraft, an upstanding drive shaft, at least two variable pitch rotor blades rotatable about the axis of said shaft and pivotally connected to said shaft for rotation, pilot operative mechanism for varying the pitch of said blades as they rotate, means for counteracting the dynamic and aerodynamic pitching moments of the rotating blades including weight means mounted to change pitch with the blades and substantially spaced from the chordlines of the blades for producing a controlled predetermined dynamic pitching moment acting on said pitch control mechanism, and means for varying said weights with respect to each blade to change the pitch changing moments of each of the several blades while maintaining the center of gravity of each blade in position.

15. In a rotory wing aircraft, an upstanding shaft, a blade, means for pivotally mounting said blade to rotate with said shaft at various angles relative to said shaft, means for varying the pitch of said blade at any position of said blade relative to said shaft, pilot actuated means for controlling the pitch of said blade, and means compensating for the combined dynamic and aerodynamic pitching moments of said blade comprising weight means mounted on said blade and substantially spaced from the chordline of said blade.

References Cited in the file of this patent
UNITED STATES PATENTS

| | | |
|---|---|---|
| 2,380,582 | Cierva | July 31, 1945 |
| 2,419,893 | Hackethal | Apr. 29, 1947 |
| 2,451,541 | Doman | Oct. 19, 1948 |

FOREIGN PATENTS

| | | |
|---|---|---|
| 124,935 | Great Britain | Apr. 10, 1919 |
| 474,611 | Great Britain | Nov. 1, 1937 |